United States Patent
Gallina

(10) Patent No.: US 6,997,699 B2
(45) Date of Patent: Feb. 14, 2006

(54) PANCAKE DIE

(75) Inventor: David N. Gallina, Nampa, ID (US)

(73) Assignee: J.R. Simplot Company, Boise, ID (US)

( * ) Notice: Subject to any disclaimer, the term of this patent is extended or adjusted under 35 U.S.C. 154(b) by 0 days.

(21) Appl. No.: 10/805,458

(22) Filed: Mar. 19, 2004

(65) Prior Publication Data

US 2004/0194637 A1    Oct. 7, 2004

Related U.S. Application Data

(60) Provisional application No. 60/460,481, filed on Apr. 4, 2003.

(51) Int. Cl.
*B29C 45/44*  (2006.01)

(52) U.S. Cl. ............ 425/556; 264/334; 425/572; 425/DIG. 58

(58) Field of Classification Search ........ 425/556, 425/572, DIG. 58, 296, 298, 576; 264/334; 426/496, 512, 513, 516
See application file for complete search history.

(56) References Cited

U.S. PATENT DOCUMENTS

| | | | |
|---|---|---|---|
| 4,438,686 A * | 3/1984 | Perez | 425/576 |
| 4,514,434 A | 4/1985 | Goldberger | |
| 4,516,291 A | 5/1985 | Goldberger | |
| 4,584,931 A | 4/1986 | Feehan | |
| 4,870,897 A | 10/1989 | Hindrich | |
| 5,871,783 A * | 2/1999 | Capodieci | 425/174.2 |
| 6,416,314 B1 | 7/2002 | LaBruno | |
| 6,604,935 B1 * | 8/2003 | Tournour et al. | 425/556 |
| 2002/0160089 A1 | 10/2002 | Cowart | |
| 2002/0182297 A1 | 12/2002 | Buhlke | |

* cited by examiner

*Primary Examiner*—Tim Heitbrink
(74) *Attorney, Agent, or Firm*—Kelly Lowry & Kelley, LLP

(57) ABSTRACT

An improved pancake die is provided for use in a pancake production system for producing pancakes having a highly uniform weight but exhibiting a substantially random peripheral shape reflective of a desirable homemade appearance. The pancake die comprises a cavity of selected geometric shape formed in a reciprocal die plate adapted for movement between a first position underlying a batter reservoir for filling the die cavity with batter, and a second position underlying a discharge plunger for pushing the formed pancake from the die cavity onto a discharge conveyor for further processing. The die cavity is subdivided into an upper zone having the selected geometric shape, and an enlarged undercut lower zone separated therefrom by a substantially radially outwardly extending step. With this configuration, the periphery of each formed pancake distorts in a substantially random manner upon engagement by the discharge plunger, to provide a desirable homemade product appearance.

27 Claims, 4 Drawing Sheets

PANCAKE DIE

This application claims the benefit of U.S. Provisional Application No. 60/460,481, filed Apr. 4, 2003.

BACKGROUND OF THE INVENTION

This invention relates generally to improvements in production systems and equipment for producing pancakes from a selected batter composition, such as a potato-based pancake batter. More particularly, this invention relates to an improved pancake die for filling with batter to form a succession of pancakes having a highly uniform and consistent mass or weight, but wherein the specific external shapes of the formed pancakes vary substantially at random to provide a desirable appearance of a homemade product.

Production systems and related equipment for use in producing pancakes from a selected batter composition are known in the art. For example, reciprocal forming systems are known include a die plate having a plurality of vertically open die cavities is translated back and forth between a filling station where the die cavities are filled with batter, and a discharge station where the thus-formed pancakes are separated from the die cavities typically by discharge onto an underlying conveyor which transports the formed pancakes for further processing such as partial cooking, freezing, packaging, etc. At the filling station, the die cavities are positioned beneath a batter reservoir to received metered volumes of batter dispensed therefrom, with an underlying stationary platen closing the undersides of the die cavities to contain the dispensed batter therein. At the discharge station, a plurality of vertically reciprocal overhead plungers are normally provided for engaging and pushing the formed pancakes onto the underlying conveyor.

Each pancake die cavity formed in the die plate has a selected geometric peripheral shape, such as a circle, oval, polygon, star, animal, or virtually any other geometric shape. In each case, however, the peripheral margins of the die cavity have been formed with a peripheral wall shape that has a substantially vertical and straight-sided wall shape to form a succession of molded pancakes having parallel upper and lower surfaces bounded by a highly regular and consistent straight-sided peripheral edge configuration. While this regularity of formed product shape may be desirable with respect to certain types of pancake products, the high degree of shape consistency provides the customer with the unmistakable impression that the product has been mass produced. By contrast, such shape-consistent products do not convey the impression that the pancake products have been freshly made by the restaurant or other food facility at which they are served. Alternately stated, such shape consistency does not provide the customer with the impression of a homemade product, wherein such homemade impression is normally associated by customers with a higher product quality.

The present invention is directed to an improved pancake die for use in pancake production systems and methods, wherein the improved pancake die is designed to produce a succession of pancakes having a highly uniform and consistent mass or weight, but wherein these pancakes have substantially random shape characteristics suggestive of a desirable homemade product.

SUMMARY OF THE INVENTION

In accordance with the invention, an improved pancake die is provided for use in a production system to produce a succession of pancakes having a highly uniform or consistent mass or weight in combination with a generally common overall size and shape characterized by a substantially random peripheral edge configuration reflective of a desirable homemade appearance.

The improved pancake die comprises one or more individual die cavities of selected geometric shape formed in a die plate adapted for movement as by reciprocation between a first position at a filling station for filling the die cavity or cavities with batter, and a second position at a discharge station whereat formed the formed pancake or pancakes are separated from the die plate as by pushing onto an underlying discharge conveyor which conveys the products for further processing. At the filling station, the die cavity or cavities are positioned beneath a batter reservoir from which a selected batter composition is metered for substantially completely filling each die cavity with a uniform batter mass or weight to form the pancakes having a selected size and geometric shape according to the shape of the die cavities. A stationary platen underlies the die plate at the filling station to close the lower sides of the die cavities and thereby contain the pancake batter therein. The movable die plate then shifts the die plate to the discharge station with the die cavity or cavities aligned with one or more overlying discharge plungers for pushing the formed pancakes from the die cavities onto the underlying discharge conveyor.

Each die cavity is defined by an upper zone having the selected geometric shape, and an enlarged undercut lower zone separated therefrom by a substantially radially outwardly extending step. At the discharge station, the discharge plungers descend into engagement with the formed pancakes within the die cavities to push the formed pancakes downwardly from the die plate. Such pushing engagement of the discharge plungers with the formed pancakes results in deformation or distortion of each pancake particularly in the peripheral edge region thereof and in a substantially random manner, to provide a desirable homemade product appearance.

Other features and advantages of the present invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
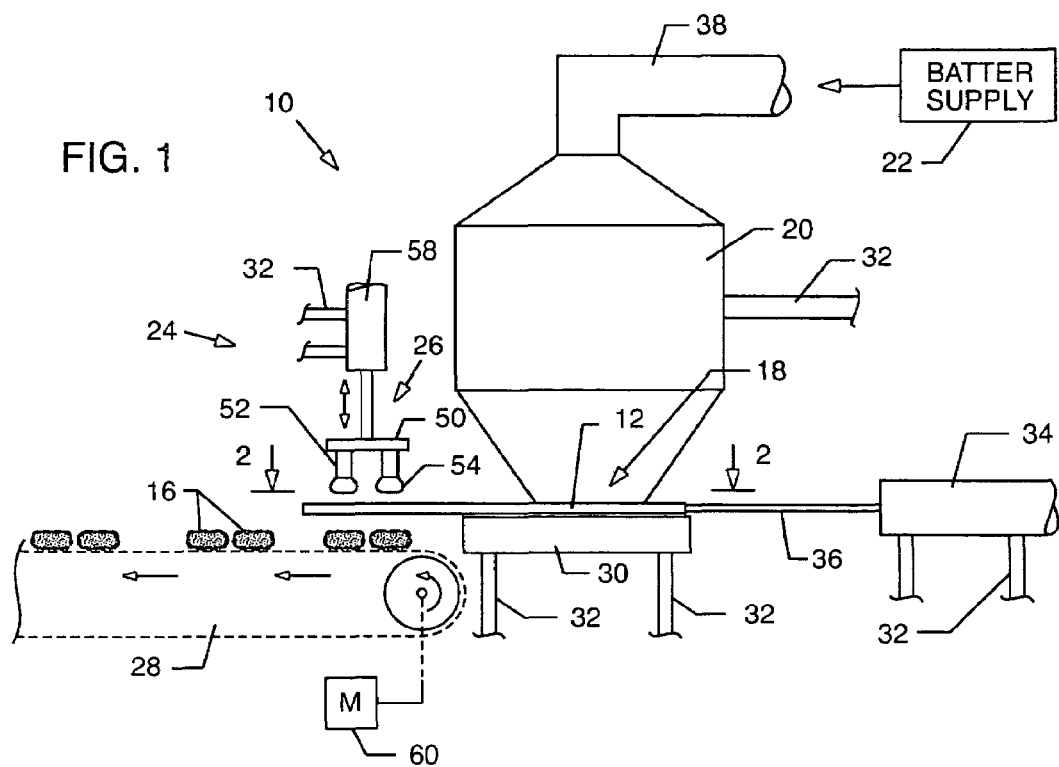
FIG. 1 is a schematic side elevation view illustrating a pancake production system incorporating a reciprocal die plate having formed therein a plurality of random shape and substantially constant volume pancake dies in accordance with the novel features of the invention, with the die plate shown in an advanced position at a discharge station for discharge of formed pancakes onto an underlying discharge conveyor.

As shown in the exemplary drawings, a pancake production system referred to generally in FIGS. 1, 5 and 7–8 by the reference numeral 10 includes an improved pancake die shown in the form of a movable die plate 12 having at least one and preferably a plurality of vertically open pancake die cavities 14 (FIGS. 2–4 and 6) of selected shape formed therein. In accordance with the invention, each of these die cavities has an undercut peripheral edge wall construction that results in the production of a succession of pancakes 16 having a substantially random peripheral edge configuration reflective of a desirable homemade appearance, but otherwise characterized by a highly uniform or consistent mass or weight.

In general, the die plate 12 is adapted for movement to a first or retracted position (FIGS. 5–6) with the die cavities 14 positioned at a filling station 18 beneath a batter reservoir 20 from which metered quantities of a relative stiff or viscous batter 22 are dispensed for substantially completely filling each die cavity 14. The die plate 12 is then shifted to a second or advanced position (FIGS. 1 and 7–8) with the die cavities 14 positioned at a discharge station 24 including an overhead plunger mechanism 26 for pushing formed pancakes 16 from the die cavities 14 downwardly onto an underlying discharge conveyor 28 which transports the formed pancakes 16 to subsequent processing stations (not shown). Importantly, as the plunger mechanism 26 engages and pushes downwardly on formed the pancakes 16 within the die cavities 14, the undercut geometry of the die cavities is believed to cause the pancake peripheries to drag against the peripheral wall of the associated die cavity 14, resulting in distortion and deformation of the pancake peripheral margin in a manner that is substantially random. Accordingly, a succession of pancakes 16 formed from each die cavity 14 have a highly consistent portion size by mass or weight, but a substantially random peripheral edge appearance that is suggestive of a desirable homemade pancake product.

The illustrative drawings show the pancake production system 10 with the die plate 12 mounted for reciprocal movement between the advanced and retracted positions. More specifically, the die plate 12 is shown slidably supported on a fixed or stationary platen 30 mounted on suitable frame members 32 at the filling station 18, in spaced relation underlying the batter reservoir 20. A hydraulic or pneumatic power unit 34 or the like, also supported on suitable fixed frame members 32, includes a reciprocal ram 36 connected to a trailing edge of the die plate 12 for shifting the die plate between the advanced and retracted positions.

The batter reservoir 20 comprises a tank or the like supported by one or more appropriate fixed frame members 32 and adapted for receiving a volume of a relatively stiff or viscous pancake batter, as by introduction thereto via a feed conduit 38 from a suitable batter supply source. In this regard, the batter 22 contained within the reservoir 20 may be subjected to pressure for positive and substantially complete filling of the die cavities 14 in the die plate 12, when the die plate is shifted to the first or retracted position as will be described in more detail. The particular batter composition may vary widely, subject to exhibiting sufficient flowability for filling the die cavities and sufficient viscosity or stiffness to maintain pancake shape integrity upon subsequent separation from the die cavities 14 at the discharge station 24 (also to be described in more detail). One preferred batter composition comprises a potato-based batter which may include a significant proportion of shredded potato pieces.

Figure 2:
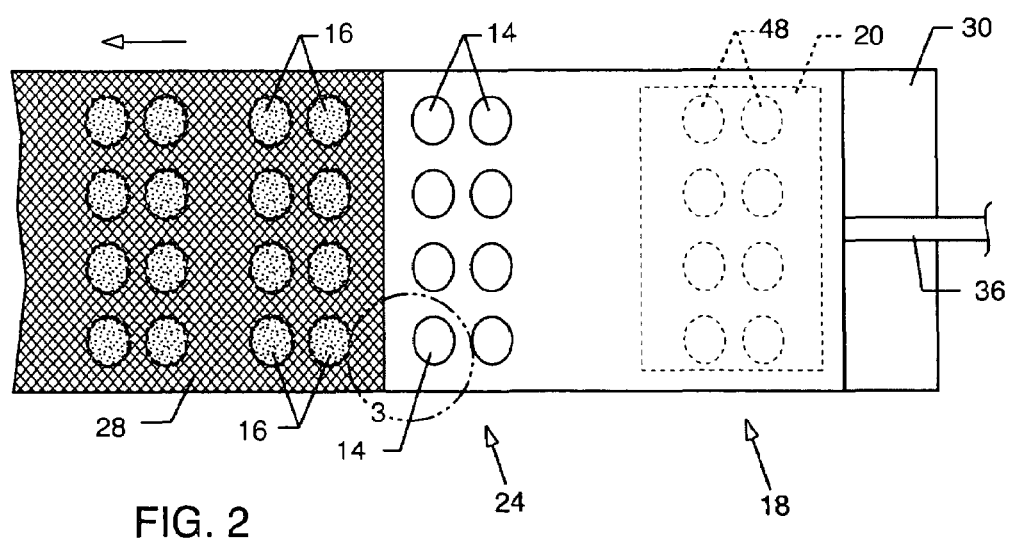
FIG. 2 is an enlarged horizontal sectional view taken generally on the line 2—2 of FIG. 1.
Figure 3:
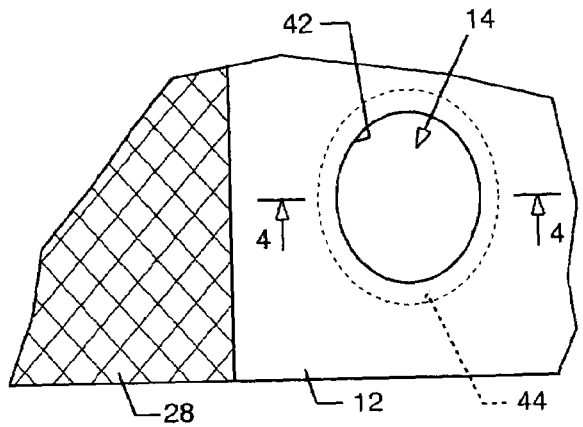
FIG. 3 is a further enlarged and fragmented sectional view corresponding generally with the encircled region 3 of FIG. 2.
Figure 4:
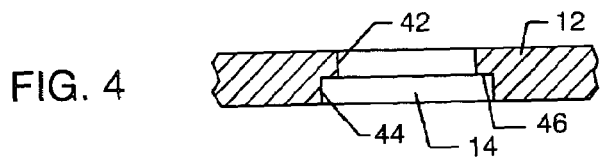
FIG. 4 is a vertical sectional view taken generally on the line 4—4 of FIG. 3.
Figure 5:
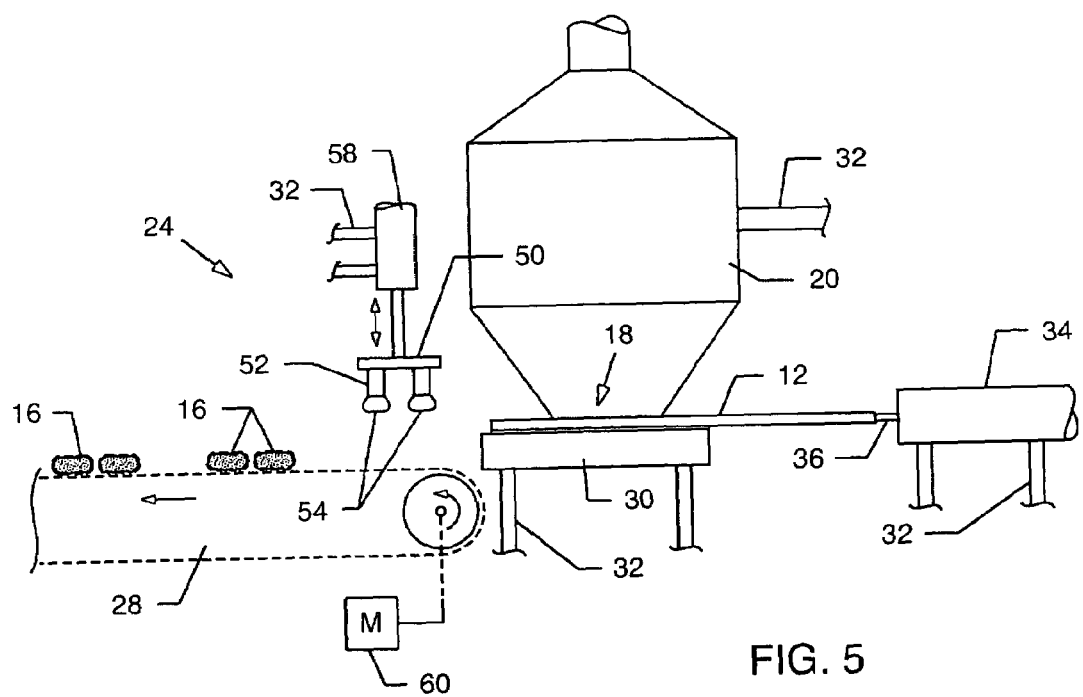
FIG. 5 is a further schematic side elevation view of the pancake production system as illustrated in FIG. 1, with the die plate shown in a retracted position at a filling station for batter filling of the pancake dies.
Figure 6:
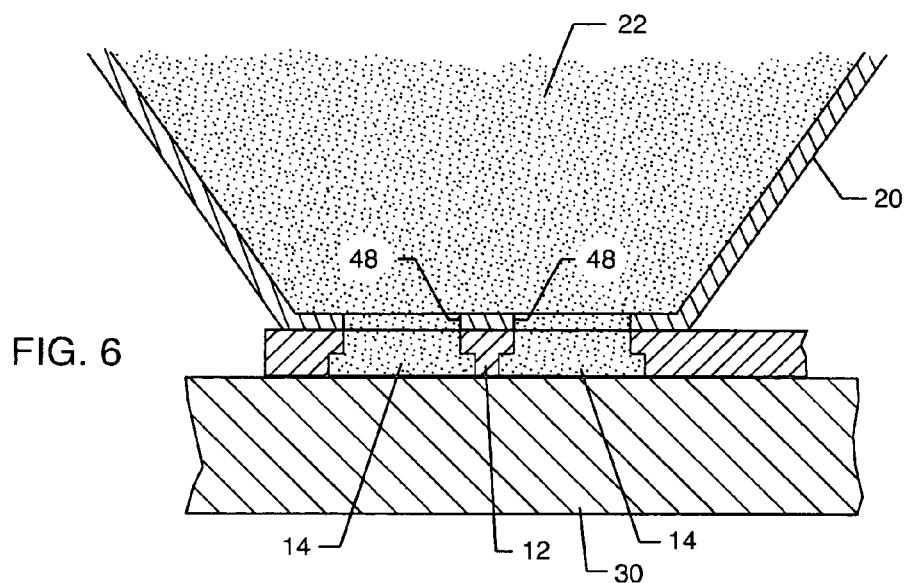
FIG. 6 is an enlarged and fragmented vertical sectional view depicting batter filling of the pancake dies.

The die plate 12 is shown best in FIGS. 2–4, and generally comprises a rectangular plate component having a plate thickness for slide-fit reciprocation with relatively close or minimal clearance between the overlying batter reservoir 20 and the underlying fixed platen 30 at the filling station 18. In one preferred form, the die plate 12 may be constructed from a suitable plastic material. As shown, a leading edge region of the die plate 12, generally opposite the connection thereof to the power unit ram 36, includes the plurality of die cavities 14. FIG. 2 depicts these die cavities 14 formed in an array of two laterally or transversely extending parallel rows of four die cavities, for a total of eight die cavities which are preferably but not necessarily identical in terms of size and shape. FIGS. 2–4 show the die cavities 14 each to have a peripheral edge wall configuration of generally oval shape, although persons skilled in the art will recognize and appreciate that a wide variety of alternative specific shapes may be used, such as circular, polygonal, star-shaped, animal or other novelty shapes, or virtually any other desired geometric configuration. It will also be understood that different numbers and row or others die cavity arrangements may be employed.

FIGS. 3–4 show the undercut edge wall configuration for each die cavity 14, in accordance with the primary aspect of the present invention. In particular, each die cavity 14 comprises a vertical opening formed through the die plate 12. Each die cavity 14 is characterized by an upper zone 42 having the selected geometric peripheral configuration, in combination with an undercut lower zone 44 having the same general geometric peripheral configuration but is larger in size. The transition between the smaller upper zone 42 and the larger lower zone 44 is defined by a radial step-or shoulder 46 (shown best in FIG. 4) which extends generally radially outwardly with a dimension on the order of about 0.25 inch.

At the filling station 18, as previously described, the die plate 12 in the first or retracted position is oriented with the die cavities 14 underlying the batter reservoir 20. In this position, the batter 22 is metered as by flow through reservoir outlets 48 (FIGS. 2 and 6) for substantially completely filling each die cavity 14 with the batter. In this regard, the batter 22 flows downwardly from the reservoir 20 into and through the upper cavity zone 42, and further downwardly to fill the lower cavity zone 44 inclusive of the undercut region underlying the step 46. The fixed platen 30 underlies the die plate 12 and thereby closes the lower ends of the otherwise open die cavities 14 to contain the batter 22 therein.

Figure 7:
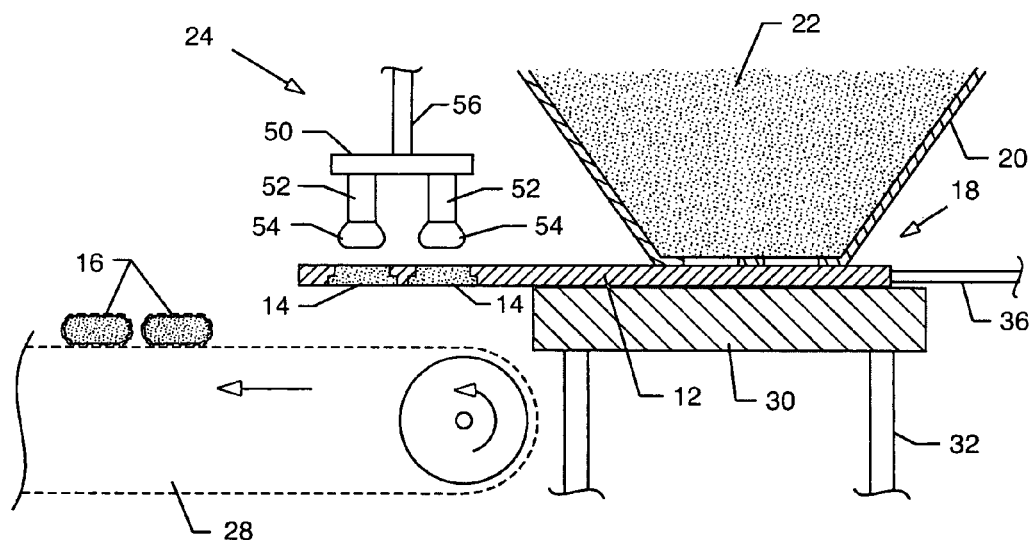
FIG. 7 is a schematic side elevation view similar to FIG. 1 and depicting the die plate in the advanced position, with the die plate being shown in vertical section to illustrate positioning of the batter filled pancake dies into alignment with an overhead plunger mechanism.
Figure 8:
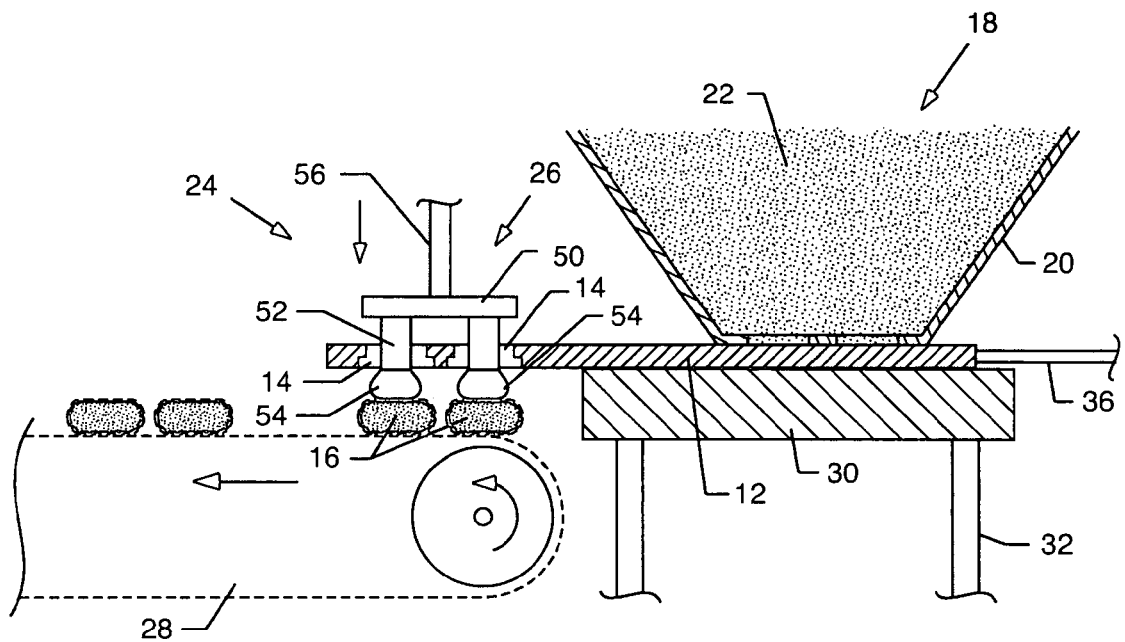
FIG. 8 is a schematic side elevation view similar to FIG. 7, and showing downward movement of the plunger mechanism for discharging the formed pancakes onto the underlying discharge conveyor.

The thus-filled die cavities 14 are shifted from the filling station 18 to the discharge station 24 upon sliding movement of the die plate 12 to the second or advanced position shown in FIGS. 1 and 7–8. In this position, the formed pancakes 16 are initially retained within the respective die cavities 14 suspended over the underlying discharge conveyor 28, and aligned beneath the overhead plunger mechanism 26. The plunger mechanism 26 comprises a vertically reciprocal carriage 50 having a plurality of individual downwardly protruding plungers 52 supported thereon. Each plunger 52 incorporates a head 54 at a lower end thereof, wherein this head 54 has a size and shape conforming closely with and adapted for slide-fit reception into an underlying respective one of the die cavities 14. In the illustrative embodiment, the carriage 50 supports two transversely extending rows of four plungers per row, each having a head 54 of generally oval shape.

The carriage 50 of the plunger mechanism 26 is coupled by a ram 56 of the like to a second frame-supported hydraulic or pneumatic power unit 58 or the like, adapted for shifting the carriage 50 and the plungers 54 thereon through a short vertical reciprocal stroke. Accordingly, when the die plate 12 shifts the batter filled die cavities 14 to the discharge station 24 in individual alignment with the plungers 52, the power unit 58 causes the plunger heads 54 to descend to engage and push the formed pancakes 16 from the die cavities 14, as viewed in FIG. 8. The pancakes 16 are thus deposited onto the underlying discharge conveyor 28 which is driven by a suitable motor 60 for transporting the pancakes 16 to one or more subsequent production processing stations (not shown) for additional production process steps such as partial cooking, freezing, packaging, etc.

Figure 9:
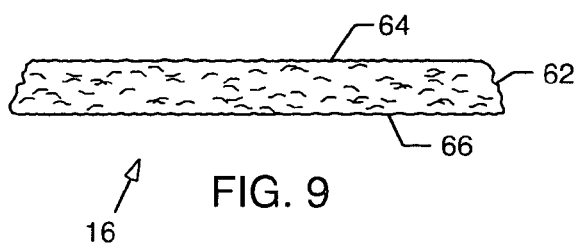
FIG. 9 is an enlarged side edge elevation view of a pancake formed by the improved pancake die of the present invention.
Figure 10:
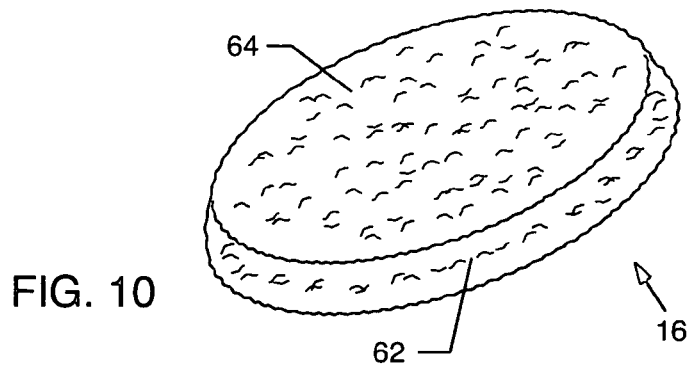
FIG. 10 is a perspective view of the formed pancake illustrated in FIG. 9.

As the plunger heads 54 engage and push downwardly on the formed pancakes 16 suspended at the discharge station 24 within the die cavities 14, the lower peripheral edges in the lower die cavity zone 44 underlying the step 46 tend to drag and distort. In general, the batter stiffness is sufficient to maintain substantial integrity of each formed pancake, although small fragments of the batter may stick and remain within this undercut zone underlying the step 46. The combination of this distortion and sticking fragments produces individual pancakes (FIGS. 9–10) having a peripheral edge 62 that is somewhat broader or larger at the bottom than at the top, with a highly irregular and substantially randomly shaped transition between the bottom-to-top peripheral edges. As a result, a succession of pancakes produced from each of the die cavities 14 will have an appearance characterized by substantially flat or planar upper and lower surfaces 64 and 66, respectively (FIGS. 9–10), in combination with the peripheral edge 66 that has a substantially random configuration with no two pancakes appearing exactly alike, thereby providing a product appearance that is suggestive of a desirable homemade product. However, despite this desirable randomness of appearance, the succession of pancakes 16 will also exhibit a highly uniform portion size by mass or weight.

Following descension of the plunger heads 54 to separate the formed pancakes 16 from the die cavities 14, the power unit 58 retracts the plunger heads 54 to a normal position spaced above the die plate 12. At this time, the first power unit 34 can be operated to retract the die plate 12 back to the first position at the filling station 18 for a repeat production cycle.

A variety of further modifications and improvements in and to the improved pancake die of the present invention will be apparent to those persons skilled in the art. Accordingly, no limitation on the invention is intended by way of the foregoing description and accompanying drawings, except as set forth in the appended claims.

What is claimed is:

1. In a pancake production system including a die plate having at least one vertically open die cavity of selected geometric shape formed therein, said die plate being movable between a first position at a filling station for receiving a quantity of pancake batter within each open die cavity to produce a formed pancake, and a second position at a discharge station for discharging the formed pancake from each said die cavity, the improvement comprising:

said at least one open die cavity being defined by a peripheral wall having an undercut wall construction, said peripheral wall being characterized by an upper zone of said selected geometric shape, a lower zone having generally the same geometric shape as said upper zone but with a comparatively larger undercut size, and a generally radially outwardly extending step separating said upper and lower zones, whereby the formed pancake within each die cavity has a peripheral edge margin that is larger at the bottom in comparison with the top thereof.

2. The pancake production system of claim 1 wherein said filling station includes means for filling said at least one die cavity with a metered volume of pancake batter to produce a formed pancake having a predetermined weight.

3. The pancake production system of claim 1 wherein said discharge station includes at least one plunger for engaging the formed pancake within said at least one die cavity for pushing said formed pancake therefrom.

4. The pancake production system of claim 1 further including an overhead plunger mechanism for engaging the formed pancake within said at least one die cavity for pushing said formed pancake downwardly therefrom.

5. The pancake production system of claim 4 further including conveyor means for receiving each formed pancake discharged from said at least one die cavity, and for transporting each formed pancake from said discharge station.

6. The pancake production system of claim 1 further including an overhead plunger mechanism for engaging the formed pancake within said at least one die cavity at for pushing said formed pancake downwardly therefrom.

7. The pancake production system of claim 1 wherein said step has a radial dimension of about 0.25 inch.

8. The pancake production system of claim 1 wherein said lower zone has a geometric shape generally corresponding to but larger than the geometric shape of said upper zone.

9. The pancake production system of claim 1 wherein said die plate is reciprocally movable between said first and second positions.

10. The pancake production system of claim 1 wherein said at least one die cavity comprises a plurality of die cavities formed in said die plate.

11. The pancake production system of claim 10 wherein said plurality of die cavities formed in said die plate each have a size for receiving substantially the same volume of pancake batter.

12. The pancake production system of claim 10 wherein said plurality of die cavities formed in said die plate each have a substantially uniform size and shape.

13. A pancake production system, comprising:
a filling station including a batter reservoir for receiving a supply of flowable pancake batter, said reservoir having at least one outlet formed therein, and said filling station further including a platen positioned in spaced relation to said at least one reservoir outlet;
a movable die plate having at least one vertically open die cavity defined by a peripheral undercut wall characterized by an upper zone of selected geometric shape, a lower zone having generally the same geometric shape as said upper zone but with a comparatively larger undercut size, and a generally radially outwardly extending step separating said upper and lower zones, whereby the formed pancake within each open die cavity has a peripheral edge margin that is larger at the bottom in comparison with the top thereof, said die plate being movable to a first position between said batter reservoir and said platen and with said at least one die cavity aligned generally with said at least one reservoir outlet, for filling said at least one open die cavity with a quantity of pancake batter to produce a formed pancake; and
a discharge station including a movable plunger mechanism;
said die plate being movable to a second position with said at least one open die cavity aligned generally with said plunger mechanism, said plunger mechanism being movable to engage and discharge the formed pancake from said at least one die cavity.

14. The pancake production system of claim 13 further including conveyor means for receiving the formed pancake discharged from said least one die cavity, and for transporting same from said discharge station.

15. The pancake production system of claim 13 wherein said filling station includes means for filling said at least one die cavity with a metered volume of pancake batter to produce a formed pancake having a predetermined weight.

16. The pancake production system of claim 13 wherein said movable plunger mechanism includes at least one movable plunger for engaging the formed pancake within said at least one die cavity for pushing said formed pancake therefrom.

17. The pancake production system of claim 16 further including means for reciprocating said at least one plunger between a retracted position spaced from said die plate and an advanced position engaging the formed pancake within said at least one die cavity.

18. The pancake production system of claim 16 wherein said movable plunger mechanism is mounted in an overhead position relative to said die plate for engaging the formed pancake within said at least one die cavity and for pushing said formed pancake downwardly therefrom.

19. The pancake production system of claim 13 wherein said step has a radial dimension of about 0.25 inch.

20. The pancake production system of claim 13 wherein said lower zone has a geometric shape generally corresponding to but larger than the geometric shape of said upper zone.

21. The pancake production system of claim 13 wherein said die plate is reciprocally movable between said first and second positions.

22. The pancake production system of claim 13 further including means for reciprocating said die plate between said first and second positions.

23. The pancake production system of claim 13 wherein said at least one die cavity comprises a plurality of die cavities formed in said die plate.

24. The pancake production system of claim 23 wherein said plurality of die cavities formed in said die plate each have a size for receiving substantially the same volume of pancake batter.

25. The pancake production system of claim 23 wherein said plurality of die cavities formed in said die plate each have a substantially uniform size and shape.

26. The pancake production system of claim 1 wherein said filling station comprises a batter reservoir mounted in an overhead position relative to said die plate.

27. The pancake production system of claim 13 wherein said batter reservoir is mounted in an overhead position relative to said die plate.

* * * * *